(12) United States Patent
Zarubica et al.

(10) Patent No.: US 9,191,252 B1
(45) Date of Patent: Nov. 17, 2015

(54) VARIABLE LENGTH HEADER FOR IDENTIFYING CHANGED PARAMETERS OF A WAVEFORM TYPE

(71) Applicant: L-3 Communications Corp., New York, NY (US)

(72) Inventors: Radivoje Zarubica, Sandy, UT (US); Thomas R. Giallorenzi, Riverton, UT (US); Samuel C. Kingston, Salt Lake City, UT (US); Loran A. Simper, Lehi, UT (US); David G. Landon, Bountiful, UT (US)

(73) Assignee: L-3 Communications Corp., New York, NY (US)

( * ) Notice: Subject to any disclaimer, the term of this patent is extended or adjusted under 35 U.S.C. 154(b) by 417 days.

(21) Appl. No.: 13/780,154

(22) Filed: Feb. 28, 2013

(51) Int. Cl.
*H04J 3/16* (2006.01)
*H04L 27/00* (2006.01)

(52) U.S. Cl.
CPC .................................. *H04L 27/0014* (2013.01)

(58) Field of Classification Search
None
See application file for complete search history.

(56) References Cited

U.S. PATENT DOCUMENTS

| | | | |
|---|---|---|---|
| 8,023,530 B1 | 9/2011 | Giallorenzi et al. | |
| 8,358,613 B1 | 1/2013 | Giallorenzi et al. | |
| 2003/0165157 A1* | 9/2003 | Pollmann et al. | 370/465 |
| 2007/0028099 A1* | 2/2007 | Entin et al. | 713/163 |
| 2007/0259683 A1* | 11/2007 | Hartikainen et al. | 455/550.1 |
| 2010/0070823 A1* | 3/2010 | Geng et al. | 714/752 |
| 2010/0111004 A1* | 5/2010 | Yi et al. | 370/329 |
| 2011/0044271 A1* | 2/2011 | Hong et al. | 370/329 |
| 2012/0054584 A1* | 3/2012 | Roh et al. | H03M 13/152 714/776 |
| 2012/0307842 A1* | 12/2012 | Petrov et al. | H04N 21/23608 370/474 |
| 2013/0223212 A1* | 8/2013 | Asterjadhi | H04L 1/0025 370/230 |

OTHER PUBLICATIONS

"An introduction to IP header compression," Effnet AB White Paper (Feb. 2004), 13 pages.
Jonsson et al., "The Robust Header Compression (ROHC) Framework," Network Working Group (Jul. 2007), 40 pages.
Westphal, "Layered IP Header Compression for IP-enables Sensor Networks," ICC (2006), 6 pages.

* cited by examiner

Primary Examiner — Otis L Thompson, Jr.
(74) Attorney, Agent, or Firm — Kirton | McConkie (57) ABSTRACT

A system in which a sending node sends modulated waveform signals to a receiving mode can include the capability to change the waveform type of the modulated waveforms from a current waveform type to a new waveform type. The sending node can generate and send to the receiving node a variable length header that provides the receiving node sufficient information for the receiving node to demodulate modulated waveform signals modulated in accordance with the new waveform type. The variable length header can identify the parameters in a parameter set defining the new waveform type that have different values as compared to the current waveform type.

29 Claims, 7 Drawing Sheets

VARIABLE LENGTH HEADER FOR IDENTIFYING CHANGED PARAMETERS OF A WAVEFORM TYPE

BACKGROUND

Some communications or network systems process a communication at one node in a hierarchical stack of processing layers in which the lowest layer in the stack modulates the communication into a waveform and transmits the waveform to another node, which receives and demodulates the waveform with the lowest layer in its stack and then further processes the demodulated waveform through successively higher layers of its stack to reproduce the original communication. Because the lowest layer in the stacks in both nodes, among other things, modulates bits into and demodulates bits from waveforms that are transmitted between the nodes, particular stability and precision is required in the lowest layer in each node. For example, if the carrier frequency, data rate, spreading rate, modulation technique, and/or other such characteristics of the modulated waveforms generated at the sending node drifts, changes, or otherwise is not precisely known or becomes unknown at the receiving node, the receiving node might be unable to demodulate the incoming modulated waveforms and could even lose synchronization or be unable to synchronize with those waveforms. Thus, because the lowest layers in the stacks of the sending node and the receiving node can be processing and detecting at a bit level, the characteristics of the modulation and other processing at those lowest levels should be precise, and an accurate characterization should be had and maintained.

Some embodiments of the present invention are directed to apparatuses and processes for efficiently communicating between the nodes a change in the characteristics of the processing that occurs in the lowest layers in the stacks in the nodes while maintaining the strict precision required to maintain communications between the nodes.

SUMMARY

In some embodiments, a process of changing a waveform type of modulated waveforms generated and transmitted by a sending node to a receiving node can include modulating bit streams into waveforms of a current waveform type to produce bit stream modulated waveforms and transmitting the bit stream modulated waveforms from the sending node through a transmission medium to the receiving node. The process can also include determining to change the current waveform type to a new waveform type, and generating a variable length header that indentifies the changed parameters in the parameter set that defines the waveform type. The variable length header can include a parameter value for each of the changed parameter(s) but not include a parameter value for all of the parameters in the parameter set. The process can then modulate the variable length header into a waveform of the current waveform type to produce a variable length header modulated waveform and transmit the variable length header modulated waveform from the sending node through the transmission medium to the receiving node. Thereafter, the process can modulate new bit streams into waveforms of the new waveform type to produce new bit stream modulated waveforms and transmit the new bit stream modulated waveforms through the transmission medium to the receiving node.

In some embodiments, a sending node can comprise a modulating module, a waveform control module, and a VLH module. The modulating module can be configured to modulate bit streams and variable length headers into modulated waveforms of a waveform type to produce modulated waveforms for transmission through a transmission medium to a receiving node. The waveform control module can be configured to set the waveform type in accordance with a parameter set that defines waveform modulation characteristics, and the waveform control module can also be configured to change the waveform type from a current waveform type to a new waveform type. The VLH module can be configured to generate a variable length header that identifies changed parameters in the parameter set that are different in the new waveform type as compared to the current waveform type. The variable length header can include a parameter value for fewer than all of the parameters in the parameter set but include a parameter for each of the changed parameter(s).

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "ones" means more than one.

As used herein, a "bit" is a binary digit that has two and only two possible states: a "low" state, and a "high" state. The term "one" with reference to a bit means the high state, and the term "zero" with reference to a bit means the low state. As used herein, a "first" state of a bit refers to either the high (one) state or the low (zero) state of the bit, and a "second" state of the bit refers to the opposite state. As used herein, a "bit stream" is a sequence of bits (e.g., contiguous bits).

As used herein, a "modulated waveform" is a band pass signal into which bits have been modulated, and a "modulated waveform" is suitable for transmission from a transmitter through a transmission medium to a receiver. A "type" of waveform (i.e., a "waveform type") is defined by a set of a fixed number of parameters (i.e., a "parameter set") that identifies the characteristics of the waveform sufficiently for a receiver to demodulate and recover the bits modulated into the waveform. Examples of parameters that can be in a parameter set that defines a waveform type include parameters that identify one or more of the following: an encryption scheme, a forward error correction (FEC) code (e.g., a linear block FEC code, a convolution FEC code, a cyclic redundancy check code, or the like), a modulation scheme (e.g., phase-shift keying, frequency-shift keying, amplitude-shift keying, quadrature phase shift keying, quadrature amplitude modulation, or the like), a data (e.g., symbol) rate, a carrier frequency, an interleaving technique, a code division multiplexing technique (e.g., a chipping rate), and/or the like.

As "robust" is used herein, a given FEC code is more "robust" than another FEC code if the given FEC code provides greater protection against transmission errors than the other FEC code. For example, the given FEC code is more robust than the other FEC code if the bit error rate (BER) of the given FEC code is less than the BER of the other FEC code or the coding gain of the given FEC code is greater than the coding gain of the other FEC code. Two or more FEC codes are "unequally robust" if each of the FEC codes provides a different level of protection against transmission errors.

Figure 1:
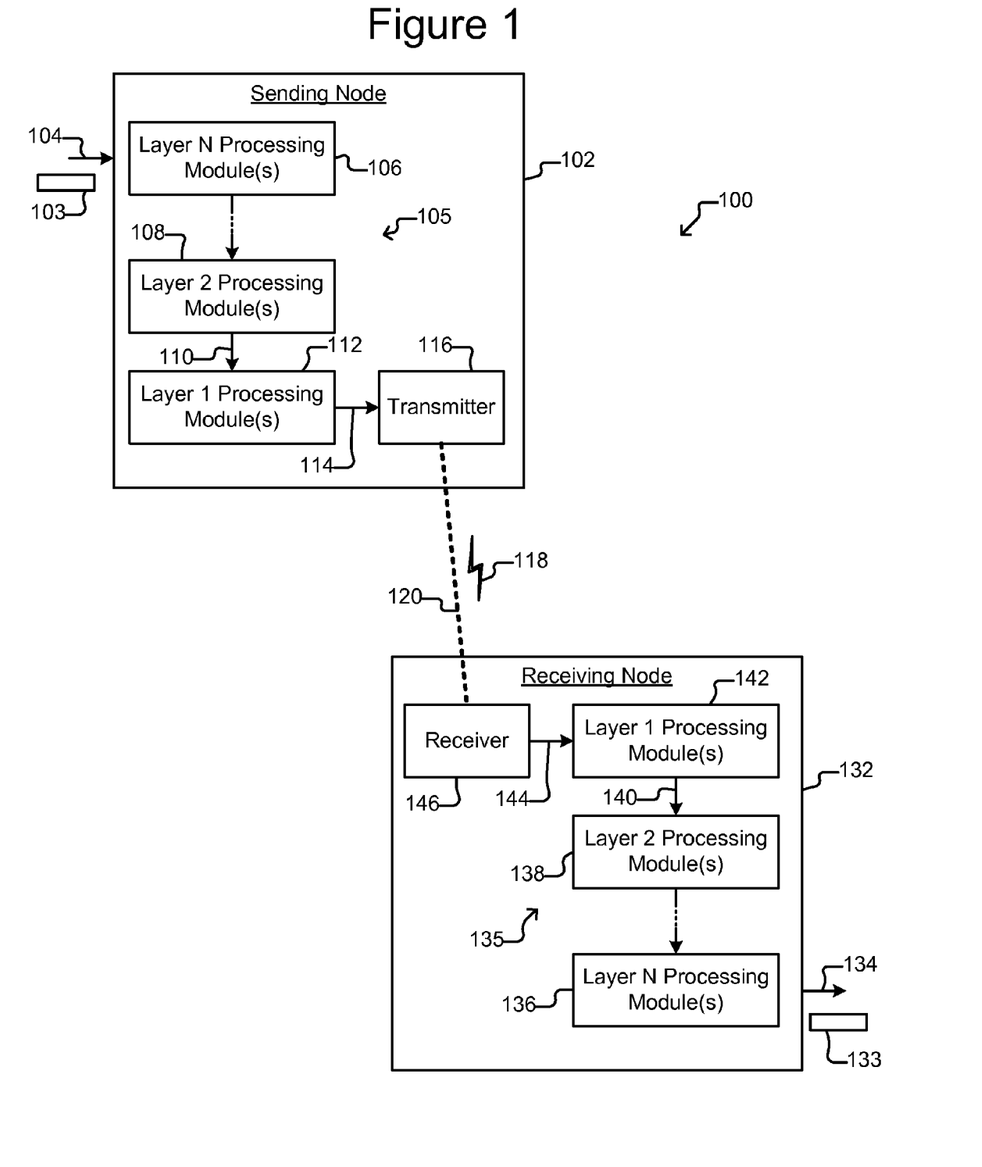
FIG. 1 illustrates a system comprising nodes that can communicate with each other according to some embodiments of the invention.

FIG. 1 illustrates a system 100 comprising nodes 102, 132 and a transmission medium 120 through which the nodes 102, 132 can communicate according to some embodiments of the invention. As shown, a sending node 102 can comprise a hierarchical stack 105 of N number of processing layers 106, 108, 112 each comprising one or more processing module(s). (Hereinafter, each of the layers of processing module(s) 106, 108, 112 is referred to as the layer x processing module(s) or more simply as the processing layer x, wherein x can be 1 through N.) A digital communication 103 (e.g., digital information) to be sent to the receiving mode 132 can be received at an input 104 to the sending node 102. The sending node 102 can process the communication 103 hierarchically at each processing layer 106, 108, 112 in the stack 105 such that each processing layer 106, 108, 112 processes the results of the next higher processing layer and provides its processing results to the next lower processing layer in the stack 105. The last processing layer—the layer 1 processing module(s) 112—can receive bit streams 110 from the layer 2 processing module(s) 108. The bit streams 110 can be the result of processing the communication 103 by the processing layers N through 2 108, 106. The layer 1 processing module(s) 112, among other things, can then modulate the bit streams 110 into modulated waveforms 114 suitable for transmission through the transmission medium 120. For example, the bit streams 110 can be modulated as corresponding symbols into the modulated waveforms 114. A transmitter 116 (which can be considered part of the processing layer 1 112) can then drive the modulated waveforms 114 as waveform signals 118 onto the transmission medium 120. Optionally, the layer 1 processing module(s) 112 can perform other processing on the bit streams 110 prior to the modulation such as encrypting the bit streams 110 and/or encoding the bit streams with an FEC code.

As also shown in FIG. 1, the receiving node 132 can comprise a receiver 146 and a hierarchical stack 135 of N processing layers 142, 138, 136, which can correspond to the N processing layers 106, 108, 112 of the stack 105 in the sending node 102. That is, the receiver 146 in the receiving node 132 can receive the waveform signals 118 from the transmission medium 120. The receiver 146 can provide the received waveform signals 118 as modulated waveforms 144 to the layer 1 processing module(s) 142, which can demodulate the modulated waveforms 144 into bit streams 140. Absent transmission or processing errors, the bit streams 140 output by the layer 1 processing module(s) 142 (which can perform the reverse of the layer 1 processing module(s) 112 in the sending node 102) can be the same as the bit streams 110 provided to the layer 1 processing module(s) 112 in the sending node 102. Thereafter, the bit streams 140 can be processed hierarchically by each processing layer 138, 136 in the stack 135, where each processing layer 138, 136 performs the reverse of its corresponding processing layer 106, 108 in the sending node 102 and then passes its results to the next higher processing layer in the stack 135. The result at output 134 of the receiving node 132 can be a communication 133 received from the sending node 102. Absent transmission or processing errors, the communication 133 is the same as the communication 103 initially received at the input 104 to the sending node 102.

As noted, the stack 105 in the sending node 102 can be hierarchical, meaning that a communication 103 received at the input 104 can be processed first by the layer N processing module(s) 106. The layer N processing module(s) 106 can then pass the results of its processing to the next lower processing layer, which can pass its results to the next lower processing layer and so on through the layer 2 processing module(s) 108 and then the layer 1 processing module(s) 112. The layer N processing module(s) 106 is the first and highest processing layer in the stack 105, and the layer 1 processing module(s) 112 is the lowest and last processing layer in the stack 105. Some of the functions performed by the layer 1 processing module(s) 112 but not performed by any of the layer N processing module(s) 106 through the layer 2 processing module(s) 108 include the following: establish and maintain a communications connection between the sending node 102 and the receiving node 132; process and modulate bit streams 110 received from the layer 2 processing module(s) 108 into modulated waveforms 114; drive the modulated waveforms 114 onto the transmission medium 120 as waveform signals 118; and provide to the receiving node 132 a sufficient description of the waveform type of the modulated waveforms 114 to allow the receiving node 132 to demodulate the received modulated waveforms 144 and extract the bit streams 140. In some embodiments, the N processing layers 106, 108, 112 of the stack 105 can correspond to one or more of the application layer, the presentation layer, the session layer, the transport layer, the network layer, the data link layer, and/or the physical layer of the Open Systems Interconnection ("OSI") seven layer reference model. The layer 1 processing module(s) 112 can thus correspond to the physical layer in the OSI seven layer reference model. Nevertheless, the number N of processing layers 106, 108, 112 in the stack 105 can be other than seven. For example, the number N of processing layers 106, 108, 112 in the stack 105 can be two or more.

Each node 102, 132 can comprise electronic circuitry and/or data processing hardware and/or software. For example, each of the processing module(s) 106, 108, 112 in the sending node 102 and each of the processing module(s) 142, 138, 136 in the receiving node 132 can comprise analog electronic circuitry, hardwired digital logic circuitry, and/or digital processing circuitry such as one or more digital processors connected to one or more digital memories. All or part of any of the layers of processing module(s) 106, 108, 112 of the sending node 102 and all or part of any of the layers of processing module(s) 142, 138, 136 of the receiving node 132 can comprise machine executable instructions (e.g., software, firmware, microcode, or the like) stored in such digital memories as non-transitory signals and configured to cause such digital processors to perform all or part of the functions described above.

The transmission medium 120 can be any transmission medium suitable for waveform signals 118, which can be, for example, radio frequency (RF) band pass signals, modulated light pulses, or the like. For example, the transmission medium 120 can be ambient air, the atmosphere of the earth, space, one or more electrical cables, one or more electrical wires (e.g., a twisted pair), one or more optical cables, or the like. The transmitter 116 can be any transmitter configured to transmit waveform signals 118 onto and through the transmission medium 120, and the receiver 146 can be any receiver for receiving waveform signals 118 from the transmission medium 120. For example, in some embodiments, the transmitter 116 can be a wireless RF transmitter, and the receiver 146 can be a wireless RF transmitter.

For ease of illustration and discussion, node 102 is identified in FIG. 1 as a sending node and node 132 is identified as a receiving node, but in some embodiments, the nodes 102, 132 can communicate with each other and thus both nodes 102, 132 can function as sending and receiving nodes. Thus, although not shown, the sending node 102 can have a receiver like receiver 146 and a stack of processing layers like stack 135 connected to the receiver for receiving and processing signals like waveform signals 118 from the receiving node 132. Similarly, although not shown, the receiving node 132 can have a transmitter like transmitter 116 and a stack of processing layers like stack 105 connected to the transmitter for generating and transmitting signals like waveform signals 118 to the sending node 102. Also, the system 100 can have more than two nodes 102, 132 all or some of which can be capable of communicating with each other.

Figure 2:
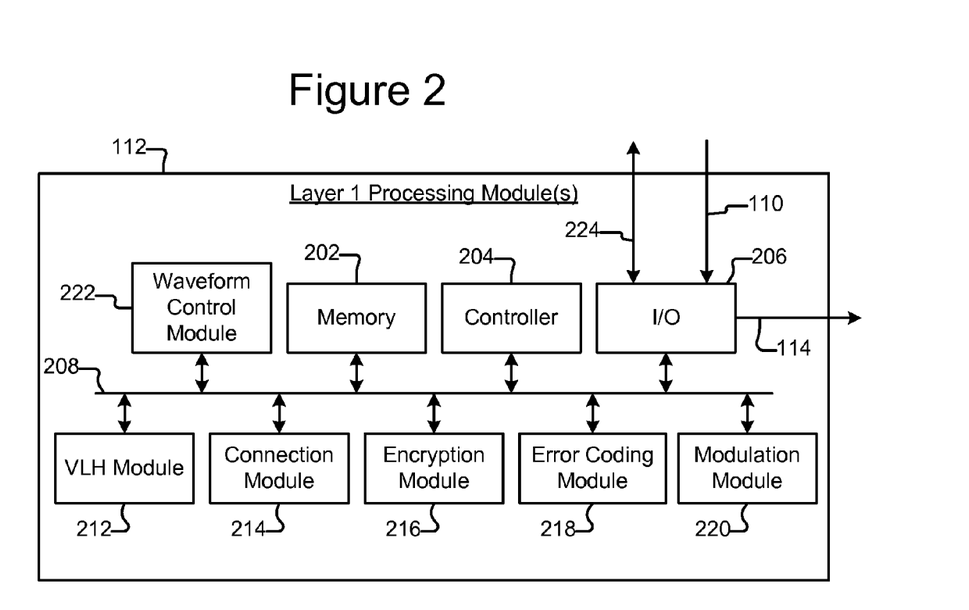
FIG. 2 shows an example configuration of the layer 1 processing module(s) in the sending node of the system of FIG. 1 according to some embodiments of the invention.

FIG. 2 illustrates an example configuration of the layer 1 processing module(s) 112 of the sending node 102 according to some embodiments of the invention. As shown, the layer 1 processing module(s) 112 can comprise a memory 202, a controller 204, input/output (I/O) 206, a connector 208 (e.g., a bus), a variable length header (VLH) module 212, a connection module 214, an encryption module 216, an error coding module 218, a modulation module 220, and a waveform control module 222. The foregoing is an example only, and any given embodiment of the layer 1 processing modules 112 can include additional module(s) and/or components than shown in FIG. 2, fewer than all of the modules) and components shown in FIG. 2, and/or different modules and components than shown in FIG. 2.

The memory 202 can be one or more digital memories (e.g., semiconductor, magnetic, optical, or the like based digital memories). The controller 204 can comprise one or more digital processors and/or hardwired digital logic circuits. For example, the controller 204 can comprise one or more digital processors (e.g., microprocessors, microcontrollers, computers, or the like) configured to execute machine readable instructions (e.g., software, firmware, microcode, or the like) stored as non-transitory signals in the memory 202. The I/O 206 can provide hardware and/or software control for input into and output from the layer 1 processing module(s) 112. For example, the I/O 206 can provide input for bit streams 110 from the layer 2 processing module(s) 108 and an output for the modulated waveforms 114 to the transmitter 116 (see FIG. 1). As another example, the I/O 206 can provide other input and/or output 224 into and/or out of the layer 1 processing module(s) 112.

The connection module 214 can establish and maintain a communications connection with the receiving node 132.

Figure 3:
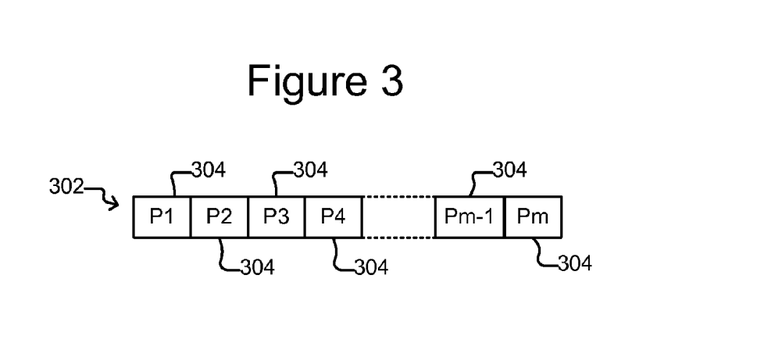
FIG. 3 is an example of a parameter set that defines a waveform type.

The waveform control module 222 can control the waveform type of the modulated waveforms 114 generated by the layer 1 processing module(s) 112. As discussed above, a waveform type can be defined by a set of a fixed number of parameters the values of which identify the characteristics of the waveform type. FIG. 3 illustrates an example of an m-parameter set 302 (i.e., a parameter set comprising m parameters) comprising m parameters 304 each of which can have two or more possible values defining a characteristic or characteristics of a waveform type. The parameters 304 can define one of a plurality of possible selections for each of some or all of the following possible characteristics of a waveform type: an encryption type by which the bit streams 110 or other data bits are to be encrypted, an FEC code by which the bit streams 110 or other data bits are to be encoded, and a modulation scheme by with the bit streams 110 or other data bits (which, as noted, can be encrypted and/or encoded with an FEC code) are to be modulated into the modulated waveforms 114. Parameters defining the modulation scheme can, for example, identify characteristics such as a modulation type (e.g., phase-shift keying, frequency-shift keying, amplitude-shift keying, quadrature phase shift keying, quadrature amplitude modulation, or the like), a data rate, a carrier frequency, an interleaving technique, a code division multiplexing technique (e.g., a chipping rate), and/or the like.

The waveform control module 222 can set and change the waveform type of the modulated waveforms 114 generated by the layer 1 processing module(s) 112 by setting the encryption module 216, error coding module 218, and/or modulation module 220 to generate the modulated waveforms 114 in accordance with particular values of the parameters 304 of the parameter set 302 (see FIG. 3). For example, the waveform control module 222 can store in the memory 202 a parameter set 302 in which the values of the parameters 304 define an initial waveform type, and the encryption module 216, error coding module 218, and/or modulation module 220 can then generate the modulated waveforms 114 as the initial waveform type. The waveform control module 222 can change the waveform type by simply setting the encryption module 216, error coding module 218, and/or modulation module 220 to generate the modulated waveforms 114 in accordance with different values of the parameters 304 of the parameter set 302. For example, the waveform control module 222 can store in the memory 202 new values of the parameters of the parameter set 302 in which the new values define a new waveform type, and the encryption module 216, error coding module 218, and/or modulation module 220 can then generate the modulated waveforms 114 as the new waveform type.

The encryption module 216, error coding module 218, and/or modulation module 220 can thus generate the modulated waveforms 114 in accordance with the "current waveform type," with is the most recent waveform type set by the waveform control module 222. The "current waveform type" is thus the initial waveform type until the waveform control module 222 changes the waveform type, after which the "current waveform type" is the most recent new waveform type set by the waveform control module 222.

The encryption module 216 can encrypt the bit streams 110 and/or other data bits that are to be sent to the receiving node 132. For example, the encryption module 216 can also encrypt variable length headers generated by the VLH module 212. As noted, the parameter set 302 can include one or more parameters 304 that identify a particular encryption scheme, and the encryption module 216 can encrypt the bit streams 110 and/or variable length headers in accordance with the values of the encryption parameters 304 for the current waveform type.

Among other advantages, encrypting the variable length header can provide added security against unauthorized interception of the transmitted waveform signals 118 by eavesdroppers or other unauthorized listeners. For example, because the variable length header includes values of modulation parameters 304 necessary to demodulate subsequent transmitted waveform signals 118 into which bit streams 110 are modulated in accordance with the new waveform type, encrypting the variable length headers can prevent an eavesdropper from having the ability to demodulate the subsequent transmitted waveform signals 118 even if the eavesdropper is able to intercept those subsequent transmitted waveform signals 118. For at least this reason, periodically changing the waveform type of the transmitted waveform signals 118 and encrypting the variable length headers that transport necessary descriptions of the new waveform type to the receiving node 132 can enhance the security of the system 100 of FIG. 1.

The error coding module 218 can encode the bit streams 110 and/or other data bits that are to be sent to the receiving node 132 with an FEC code. For example, the error coding module 218 can also encode variable length headers generated by the VLH module 212 with an FEC code. As noted, the parameter set 302 can include one or more parameters 304 that identify a particular FEC code, and the error coding module 218 can encode the bit streams 110 and/or variable length headers in accordance with the FEC code identified and defined by the corresponding parameters 304 for the current waveform type. Examples of suitable FEC codes include linear block codes, convolution codes, cyclic redundancy check codes, or the like.

Utilizing FEC coding can increase the reliability and robustness of the system 100. Because the layer 1 processing module(s) 112 in the sending node 102 and the layer 1 processing module(s) 142 in the receiving node 132 operate at the bit level (e.g., modulating bits whether from bit streams 110 or bits of a variable length header generated by the VHL module 212), the layer 1 processing module(s) 142 can lose complete track of incoming waveform signals 118 if the layer 1 processing module(s) 142 do not have precise, accurate, and updated values of the changed parameters 304 in the parameter set 302 that defines a new waveform type. FEC coding that can at least allow the layer 1 processing module(s) 142 in the receiving node 132 to detect an error in a variable length header containing new values for parameters 304 and possibly correct the errors can increase the likelihood that, even if transmission errors corrupt waveform signals 118 carrying a variable length header, the receiving node 132 will nevertheless be able to correctly interpret the new values of the parameters 304 in the variable length header.

The encryption module 216 need not encrypt all bit streams 110 or variable length headers and, indeed, some embodiments of the layer 1 processing module(s) 112 do not include the encryption module 216. If the encryption module 216 is present and encrypts bit streams 110 or variable length headers, the encryption module 216 can do so before or after the error coding module 218 encodes the bit streams 110 and/or variable length headers. Of course the encryption module 216 can encrypt the bit streams 110 and variable length headers even if the error coding module 218 does not encode the bit streams 110 and variable length headers.

Likewise, the error coding module 218 need not encode all bit streams 110 or variable length headers and, indeed, some embodiments of the layer 1 processing module(s) 112 do not include the error coding module 218. If the error coding module 218 is present and encodes bit streams 110 or variable length headers, the error coding module 218 can do so before or after the encryption module 216 encrypts the bit streams 110 and/or variable length headers. Of course the error encoding module 218 can encode the bit streams 110 and variable length headers even if the encryption module 216 does not encrypt the bit streams 110 and variable length headers.

Regardless of whether the encryption module 216 encrypts or the error coding module 218 encodes the bit streams 110, the modulation module 220 can modulate the bit streams 110 and/or other data bits that are to be sent to the receiving node 132 into the modulated waveforms 114. For example, the modulation module 220 can also modulate variable length headers generated by the VLH module 212 into the modulated waveforms 114. As noted, the parameter set 302 can include one or more parameters 304 that identify a particular modulation scheme, and the modulation module 220 can modulate the bit streams 110 and/or variable length headers into the modulated waveforms 114 in accordance with the modulation scheme identified and defined by the modulation parameters 304 for the current waveform type. As noted above, examples of possible modulation scheme parameters include a modulation type (e.g., phase-shift keying, frequency-shift keying, amplitude-shift keying, quadrature phase shift keying, quadrature amplitude modulation, or the like), a data rate, a carrier frequency, an interleaving technique, a code division multiplexing technique (e.g., a chipping rate), and/or the like.

The waveform control module 222, VLH module 212, connection module 214, encryption module 216, error coding module 218, and modulation module 220 can comprise hardware and/or software. For example, each of the foregoing module(s) can comprise analog circuitry, hardwired logic circuitry, and/or software (e.g., machine executable instructions stored in the memory 202 and executed on the controller 204).

Figure 4:
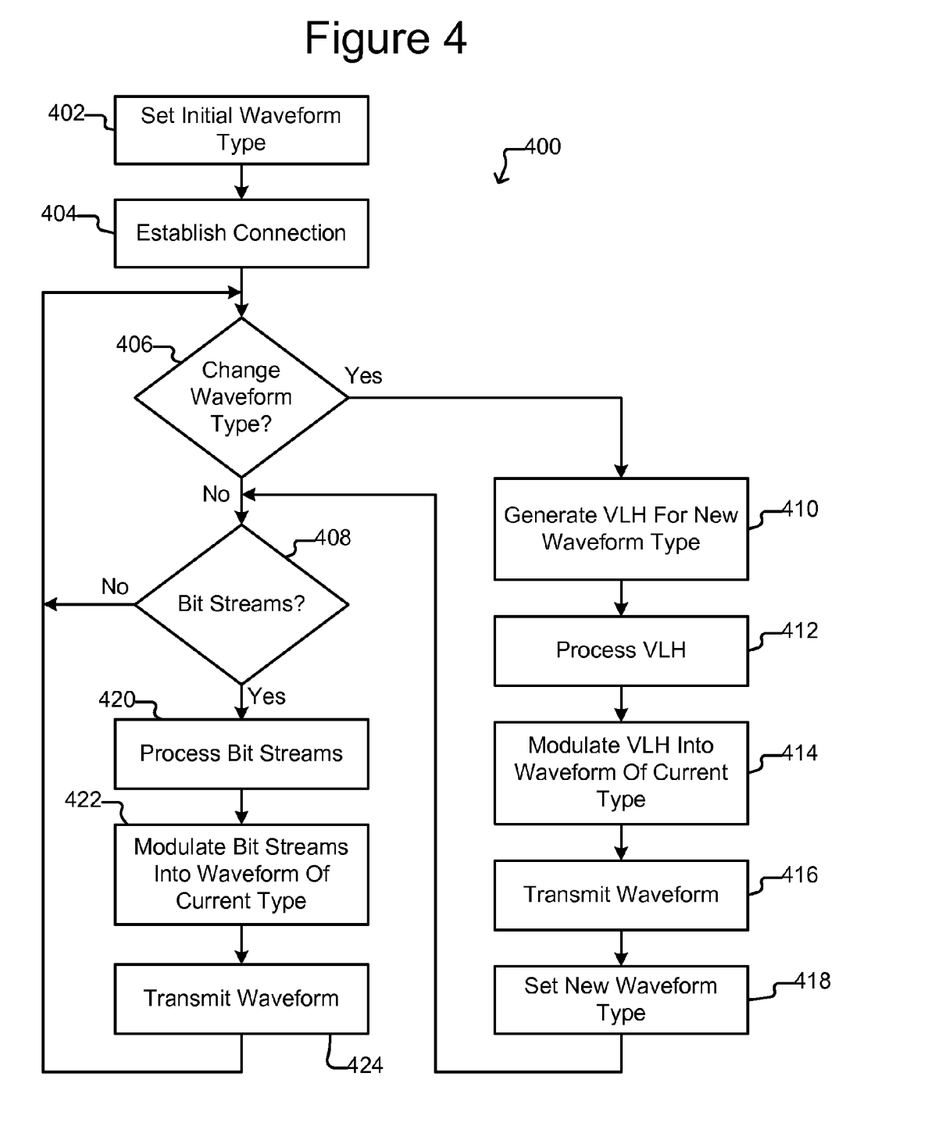
FIG. 4 is a simplified flow chart illustrating an example operation of the layer 1 processing module(s) in the sending node of the system of FIG. 1 according to some embodiments of the invention.

FIG. 4 illustrates a process 400 that is an example of operation of the layer 1 processing module(s) 112 of FIG. 2. Generally as noted, the module(s) 212, 214, 216, 218, 220, 222 of FIG. 2 can be configured as hardwired logic circuitry and/or software stored in the memory 202 to be executed by the controller 204. One or more of the module(s) 212, 214, 216, 218, 220, 222 can thus be configured as hardwired logic circuitry and/or software stored in the memory 202 to perform all or part of the process 400.

As shown in FIG. 4, at step 402, the process 400 can set an initial waveform type for the modulated waveforms 114. For example, the waveform control module 222 can perform step 402 by storing in the memory 202 an initial parameter set 302 that defines the initial waveform type generally as discussed above.

At step 404, the process 400 can establish a communications connection with the receiving node 132. The layer 1 processing module(s) 112 in the sending node 102 can perform step 404 by establishing a communications connection with the layer 1 processing module(s) 142 in the receiving node 132. Step 404 can include providing the layer 1 processing module(s) 142 in the receiving node 132 with the initial parameter set 302 that defines the initial waveform type as discussed above with respect to step 402. Step 404 can be performed, for example, by the connection module 214.

At step 406, the process 400 can determined if the waveform type is to be changed to a new waveform type. If not, the process 400 can proceed to step 408, where the process 400 can determine if there are bit streams 110 from the layer 2 processing module(s) 108 to be sent to the receiving node 132. If not, the process 400 can loop at steps 406 and 408 waiting either to change the waveform type as indicated at step 406 or for bit steams 110 as indicated at step 408.

If bit streams 110 are indicated at step 408, the process 400 can process the bit streams 110 at step 420. For example, processing at step 420 can include encrypting the bit streams 110, for example, with the encryption module 216 as discussed above. Processing at step 420 can alternatively or in addition include encoding the bit streams 110 with an FEC code, which can be performed by the error coding module 218. Processing at step 420 can alternatively or in addition include processing the bit streams 110 in other ways. As yet another alternative, no processing of the bit streams 110 need be performed at step 420. That is, step 420 can be skipped or not included in the process 400.

At step 422, the process 400 can modulate the bit streams 110 (as processed at step 420) into modulated waveforms 114, which can be the "current waveform type" as defined above. Step 422 can be performed, for example, by the modulation module 220 as discussed above.

At step 424, the modulated waveforms 114 can be transmitted as waveform signals 118 through the transmission medium 120 to the receiving node 132. Step 424 can be performed, for example, by the transmitter 116 (see FIG. 1), which as noted can be part of processing layer 1 112.

After step 424, the process 400 has thus processed and modulated bit streams 110 into modulated waveforms 114 of the current waveform type as defined by the values of the parameter set 302 and transmitted the modulated waveforms 114 as waveform signals 118 into the transmission medium 120 to the receiving node 132. As shown in FIG. 4, the process 400 can then branch back to steps 406 and 408 to wait to change the waveform type or process, modulate, and transmit more bit streams 110.

If at step 406 it is determined that the waveform type is be changed, the process 400 can change the current waveform type by executing steps 410 through 418. A positive determination at step 406 to change the waveform type of the modulated waveforms 114 can arise for any number of reasons. For example, the waveform control module 222 can determine that the waveform type should change. The waveform control module 222 can do so based on any number of considerations including changes in the conditions of the transmission medium 120, the need for greater or lesser security, the need for greater or lesser quality-of-service communications between the nodes 102, 132, or the like. For example, the waveform control module 222 can execute part or all of any of the processes or be configured like part or all of any of the apparatuses for determining to change and then changing to a new waveform type disclosed in U.S. Pat. No. 8,023,530. As another example, a message or control signal directing a change to a new waveform type can be received through the input/output 224 (see FIG. 2) from a device or module outside the layer 1 processing module(s) 112, which can be in some instances outside the sending node 102.

At step 410, the process 400 can generate a variable length header that identifies the parameters 304 in the parameter set 302 (see FIG. 3) that defines the new waveform type that have different values as compared to the values of the parameters 304 that define the current waveform type. For example, if only x number of the parameters 304 in the m-parameter set 302 that defines the new waveform type have different values than the parameters 304 in the m-parameter set 302 that defines the current waveform type, the process 400 generates at step 410 a variable length header that identifies as changed and includes values for the x parameters 304 of the new waveform type that are different. The process 400 can, at step 410, identify as changed and include values for only the x number of the parameters 304 of the new waveform type that are different but not identify as changed or provide values for any of the y number of the parameters 304 that are the same for the new waveform type as for the current waveform type (where y is the difference between m and x (y=m−x)). Alternatively, in some embodiments, the process 400 can, at step 410, include values for some but not all of the y number of the parameters 304 that are the same for the new waveform type as for the current waveform.

Figure 5:
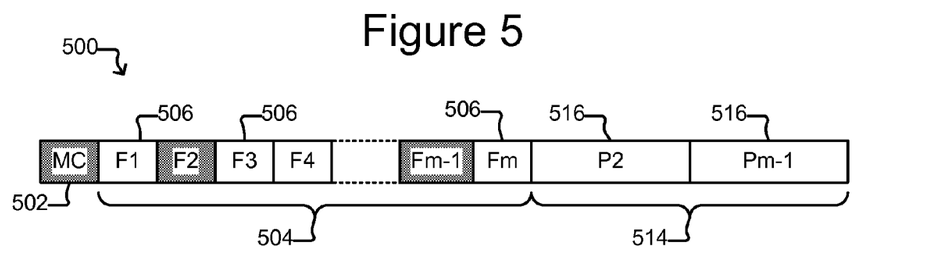
FIG. 5 is an example of a variable length header according to some embodiments of the invention.
Figure 6:
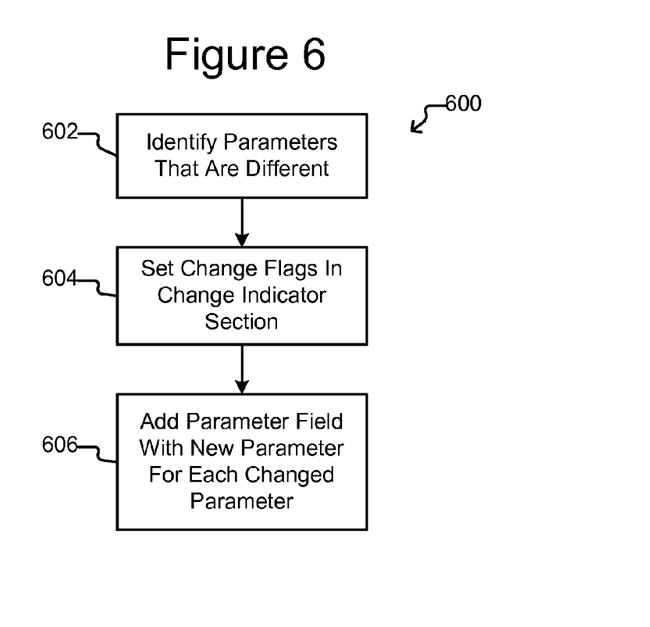
FIG. 6 is a simplified flow chart illustrating an example of a process for generating the variable length header of FIG. 5 according to some embodiments of the invention.
Figure 7:
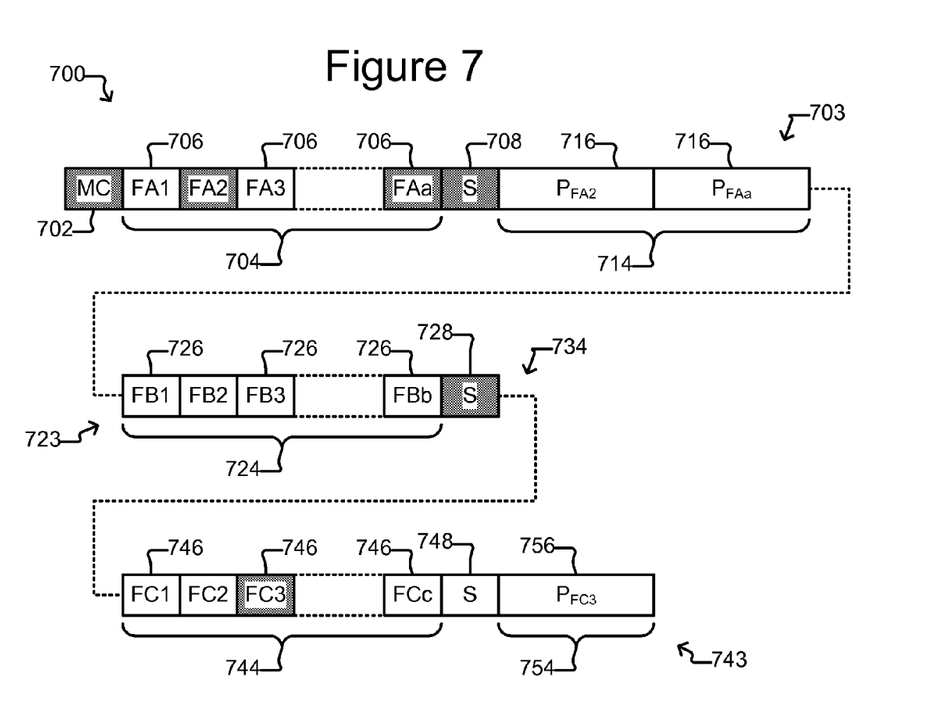
FIG. 7 is another example of a variable length header according to some embodiments of the invention.
Figure 8:
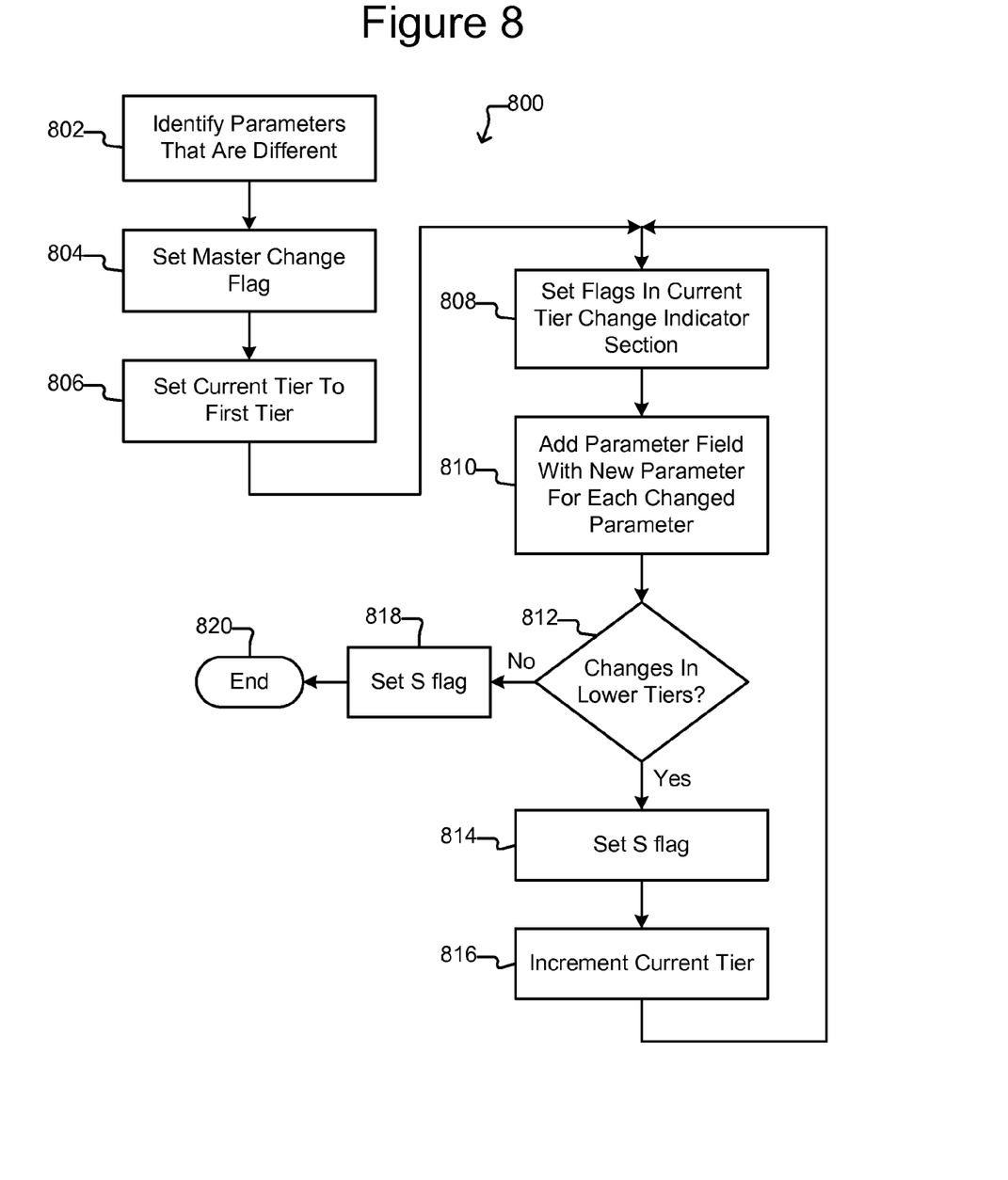
FIG. 8 is a simplified flow chart showing an example of a process for generating the variable length header of FIG. 7 according to some embodiments of the invention.

FIGS. 5 and 7 illustrate non-limiting examples of variable length headers 500 and 700, and FIGS. 6 and 8 illustrate examples of processes 600 and 800 for generating the variable length headers 500 and 700. Step 410 of FIG. 4 can be performed by the VHL module 212, which can be configured, in some embodiments, to perform step 410 in accordance with the process 600 or the process 800.

Turning first to FIG. 5, as shown, the header 500 can comprise a master change (MC) flag 502, a change indicator section 504, and a parameter section 514. The MC flag 502 can indicate whether any parameter 304 value of the new waveform type is different as compared to the current waveform type. The change indicator section 504 can comprise a change flag 506 for each parameter 304 in the parameter set 302, and each such change flag 506 can indicate whether the corresponding parameter 304 is different for the new waveform type as compared to the current waveform type. For example, for the m-parameter set 302 shown in FIG. 3, the header 500 has m change flags 506 in the change indicator section 504, and the value of each change flag 506 indicates whether its corresponding parameter 304 is different for the new waveform type as compared to the current waveform type. The order of the change flags 506 in the change indicator section 504 can be the same as the order of the parameters 304 in the parameter set 302.

As also shown in FIG. 5, the parameter section 514 of the header 500 can include a parameter field 516 for each change flag 506 that indicates a change but not a parameter field 516 for any of the change flags 506 that indicate no change. There can thus be between zero and m parameter fields 516 for any given instance of the header 500. The order of the parameter fields 516 in the parameter section 514 can be the same as the order of the change flags 506 in the change indicator section 504.

Each parameter field 516 can contain the new value of a corresponding one of the different parameters 304 for the new waveform type. The new parameter value(s) in the parameter field(s) 516 can be absolute or relative. An absolute value can be the new value of the parameter 304 in the parameter set 302 that defines the new waveform type, and a relative value can be a value that is to be applied to (e.g., added to, subtracted from, by multiplied by, divided by, or the like) the value of the parameter 304 in the parameter set 302 that defines the current waveform type. For example, a relative value can be a difference between the new value of the parameter 304 for the new waveform type and the current value of the parameter 304 for the current waveform type. In the foregoing example, the new value for the current waveform type is thus obtained by adding the relative value to the current value.

In the example shown in FIG. 5, it is assumed that only two parameters—parameters P2 and Pm−1—in the parameter set 302 (see FIG. 3) are different for the new waveform type compared to the current waveform type. As shown by the shading in FIG. 5, the MC flag 502 indicates a change. Only flags 506 F2 and Fm−1 in the change indicator section 504 indicate a changed parameter, and there is a parameter field 516 in the parameter section 514 only for parameters P2 and Pm−1, which contain the values for those parameters for the new waveform type. The variable length header 500 can thus indicate with the MC flag 502 that the new waveform type is different than the current waveform type. Moreover, the variable length header 500 can indicate with change flags 506 in the change indicator section 504 which parameters 304 of the parameter set 302 are different for the new waveform type compared to the current waveform type, and the header 500 can include values in the parameter section 514 only for the parameters 304 that are different. As noted above, however, the parameter section 514 can include fields 516 for values of parameters 304 that are not different for the new waveform type, and corresponding flags 506 in the change indicator section 504 can indicate the presence of such values.

The MC flag 502 and each of the change flags 506 can have two possible states and thus can each consist of a single bit. In contrast, the parameter fields 516 can each hold a new value for a parameter 304 and thus typically can each consist of many bits. In some embodiments, however, the MC flag 502 and/or each change flag 506, though having only two possible states, can each consist of more than one bit. In some embodiments, the MC flag 502 and each of the change flags 506 can comprise two, four, eight, twelve, sixteen, thirty-two, forty-eight, sixty-four or more bits to represent a binary state. Moreover, in some embodiments, the MC flag 502 can comprise more bits than any one of the change flags 506. Regardless, the MC flag 502 and the change flags 506 can thus be provided with more protection against transmission errors than the parameter fields 516 in a transmission of a modulated waveform 114 containing a variable length header 500, which can also provide more protection against transmission errors than a transmission of modulated waveforms 114 containing bit streams 110. In addition, the MC flag 502 can be provided with more protection against transmission errors than any of the change flags 506. Thus, for example, the MC flag 502 can comprise more bits (e.g., two, three, four, five, six, seven, eight, or more times the number of bits) than any one of the change flags 506.

Utilizing multiple bits to convey the binary possible states of each of the MC flag 502 and the change flags 506 can increase the likelihood that, even if transmission errors corrupt waveform signals 118 carrying a variable length header 500 to the receiving node 132, the receiving node will nevertheless be able to correctly interpret the MC flag 502 and the change flags 506 and thus correctly determine at least that the waveform type has changed and possibly also which parameters 304 are different. Indeed, the more bits that are used in the MC flag 502 and in each of the change flags 506, the greater the likelihood that the MC flag 502 and the change flags 506 will be correctly interpreted by the receiving node 132 even when the variable length header 500 is corrected by transmission errors. This can increase the robustness and reliability of the system 100 (see FIG. 1). For example, if despite transmission errors that corrupt the new parameter values, the receiving node 132 is at least able to determine that the values of parameters 304 changed and possibly which parameters 304 changed, the receiving node 132 can request retransmission of the values of those parameters 304.

In addition to indicating the states of the MC flag 502 and/or change flags 506 with a plurality of bits as discussed above, other strategies for providing the MC flag 502 and/or the change flags 506 with more robust error protection than the parameter fields 516 can be employed. For example, the MC flag 502 and/or change flags 506 can be encoded with an FEC code that is more robust than an FEC code utilized to encode the parameter fields 516. As another example, the MC flag 502 can be encoded with an FEC code that is more robust than an FEC code utilized to encode the change flags 506, which can be encoded with a more robust FEC code than utilized to encode the parameter fields 516. Alternatively, the MC flag 502 can be encoded with an FEC code that is less robust than an FEC code utilized to encode the change flags 506. More generally, two or more of the MC flag 502 and the change flags 506 can be encoded with FEC codes that are unequally robust.

As mentioned, the process 600 of FIG. 6 is an example of a process that can generate the variable length header 500 of FIG. 5. The process 600 is thus an example of performing the step 410 of FIG. 4.

As shown in FIG. 6, at step 602, the process 600 can identify the parameters 304 of the parameter set 302 for the new waveform type that are different than for the current waveform type. This can be accomplished, for example, by comparing the parameter set 302 for the new waveform type to the parameter set 302 for the current waveform type. As mentioned, in the example illustrated in FIG. 5, it is assumed that only parameters 304 P2 and Pm−1 (see FIG. 3) are different for the new waveform type.

Referring again to FIG. 6, at step 604, the process 600 can set the MC flag 502 to indicate that the new waveform type is different than the current waveform type, and the process 600 can set to "changed" the change flags 506 in the change indicator section 504 of the variable length header 500 that correspond to the changed parameters 304. The process 600 can also set all of the other flags 506 to indicate no change. Thus, in the example of FIG. 5 in which only parameters P2 and Pm−1 are different, the process 600 sets change flags 506 F2 and Fm−1 to indicate a change and sets all of the other change flags 506 to indicate no change as illustrated in FIG. 5. Although not shown in FIG. 6, if no parameters 304 have different values, the process 600 can set the MC flag 502 to indicate no change, and the process 600 can terminate. The resulting variable length header 500 can thus consist solely or essentially of the MC flag 502.

At step 606 of FIG. 6, the process 600 can create a parameter field 516 with a new parameter value (which can be absolute or relative) for each of the parameters 304 indicated by change flags 506 to be different in the new waveform type. Thus, in the example of FIG. 5 in which only parameters 304 P2 and Pm−1 are different, the process 600 creates a parameter field 516 for parameter P2 with the new value of parameter P2 followed by another parameter field 516 for Pm−1 with the new value of parameter Pm−1 as illustrated in FIG. 5.

The variable length header 500 and the process 600 are examples only, and variations are contemplated. For example, the variable length header 500 need not include the MC flag 502. Moreover, the variable length header 500 is but one example of a variable length header that can be generated at step 410 of FIG. 4. As noted above, the variable length header 700 of FIG. 7 is another non-limiting example of such a variable length header.

As shown, the variable length header 700 is tiered and can comprise a master change (MC) flag 702 and a plurality of tiers. In the example shown in FIG. 7, the variable length header 700 has three tiers 703, 723, 743, but the variable length header 700 can have more or fewer of such tiers. Each tier 703, 723, 743 can be generally similar in format to the variable length header 500 of FIG. 5 in the sense that each tier 703, 723, 743 can comprise a change indicator section with change flags and a parameter section with parameter fields for parameters that correspond to a change flag that indicates a change. Unlike the variable length header 500 of FIG. 5, however, the change indicator section in each tier 703, 723, 743 has a change flag only for a sub-set of the parameters 304 in the parameter set 302 (see FIG. 3. Also, each tier 703, 723, 743 can have a subsequent (S) flag 708, 728, 748 that indicates whether there is a subsequent tier in the header 700. Like the MC flag 502 of FIG. 5, the MC flag 702 of the variable length header 700 can indicate whether any parameter 304 value of the new waveform type is different as compared to the current waveform type.

The header 700 of FIG. 7 presupposes that the parameters 304 of the parameter set 302 (see FIG. 3) are figuratively divided into groups (i.e., sub-sets), for example, by a common characteristic or characteristics. For example, the parameters 304 can be divided into groups in accordance with an expected likelihood that the values of the parameters 304 change from waveform type to different waveform type. Thus, for example, the parameters 304 can be divided into a first group of the parameters 304 that are the most likely to change from waveform type to different waveform type, into a second group that are next most likely to change, into a third group that are next most likely to change, and so on. As another example, the parameters 304 can be divided into groups in accordance with a likelihood that the parameters will change together from waveform type to different waveform type. Thus, for example, the parameters 304 can be divided into a first group of the parameters 304 that are likely to change as a group from waveform type to different waveform type, into a second group of the parameters 304 that are likely to change as a group from waveform type to different waveform type, into a third group of the parameters 304 that are likely to change as a group from waveform type to different waveform type, and so on.

Regardless of the criteria for figuratively dividing the parameters 304 of the parameter set 302 into groups, each tier 703, 723, 743 of the variable length header 700 can correspond to one of the groups. Thus, in the example shown in FIG. 7, the change flags 706 in the change indicator section 704 of the first tier 703 can correspond to the parameters in the first group. Similarly, the change flags 726 in the change indicator section 724 of the second tier 723 can correspond to the parameters in the second group, and the change flags 746 in the change indicator section 744 of the third tier 743 can correspond to the parameters in the third group. It is noted that the parameters 304 in a group need not be contiguous to each other in the parameter set 302.

Referring more specifically to the example illustrated in FIG. 7, as shown, the first tier 703 can comprise a change indicator section 704 that comprises a number of change flags 706 (which are denoted FA1, FA2, FA3, . . . , FAa in FIG. 7) in which there is a change flag 706 for every parameter 304 in a group A of a number of the parameters 304 in the parameter set 302. The a number of parameters 304 in group A need not be contiguous in the parameter set 302. The change flags 706 can otherwise be generally like the change flags 506 of FIG. 5 as discussed above. For example, each change flag 706 can indicate whether the value of its corresponding parameter 304 is different in the new waveform type compared to the current waveform type.

The parameter section 714 of the first tier 703 can be generally the same as the parameter section 514 of FIG. 5. That is, the parameter section 714 can include a parameter field 716 only for parameters 304 of the parameter set 302 whose change flag(s) 706 in the change indicator section 704 indicate a change generally as discussed above with respect to FIG. 5, and each such parameter field 716 can hold the value (which can be absolute or relative) of the corresponding parameter in the new waveform type also generally as discussed above with respect to FIG. 5. Alternatively, the parameter section 714 can include parameter fields 716 for some but not all of the parameters of group A of the parameter set that are the same for the current waveform type and the new waveform type, and the corresponding change flags 706 can indicate the presence of such parameter values.

In the example illustrated in FIG. 7, only the parameters 304 in Group A of the parameter set 302 that correspond to change flags 706 FA2 and FAa are different for the new waveform type, and thus only change flags 706 FA2 and FAa indicate a change as shown by the highlighting in FIG. 7. There are, therefore, parameter fields 716 in the parameter section 714 for the parameters $P_{FA2}$ and $P_{FAa}$, where parameters $P_{FA2}$ and $P_{FAa}$ are the parameters 304 in the parameter set 302 that correspond to change flags 706 FA2 and FAa. It is noted that parameters $P_{FA2}$ and $P_{FAa}$ are not necessarily the second parameter P2 or what would be the ath parameter Pa of the parameters 304 in the parameter set 302 (see FIG. 3).

As shown in FIG. 7, the first tier 703 can also include an S flag 708 that indicates that there is a subsequent tier. In the example shown in FIG. 7, there is a subsequent tier, namely, a second tier 723, and the S flag 708 is consequently highlighted in FIG. 7.

The second tier 723 can be generally similar in structure and format to the first tier 703. As shown, the second tier 723 can comprise a change indicator section 724 that comprises b number of change flags 726 (which are denoted FB1, FB2, FB3, . . . , FBb in FIG. 7) in which there is a change flag 726 for every parameter 304 in a group B of b number of the parameters 304 in the parameter set 302. The b number of parameters 304 in group B need not be contiguous in the parameter set 302. The change flags 726 can otherwise be generally like the change flags 506 of FIG. 5 as discussed above. For example, each change flag 726 can indicate whether the value of its corresponding parameter 304 is different in the new waveform type compared to the current waveform type.

The parameter section 734 of the second tier 723 can be generally the same as the parameter section 514 of FIG. 5. That is, the parameter section 734 can include a parameter field (none are shown in FIG. 7) only for parameters 304 of the parameter set 302 whose change flag(s) 726 in the change indicator section 724 indicate a change generally as discussed above with respect to FIG. 5, and each such parameter field (none are shown in FIG. 7) can hold the value (which can be absolute or relative) of the corresponding parameter in the new waveform type also generally as discussed above with respect to FIG. 5. Alternatively, the parameter section 734 can include parameter fields (none are shown in FIG. 7) for some but not all of the parameters in group B of the parameter set that are the same for the current waveform type and the new waveform type, and the corresponding change flags 726 can indicate the presence of such parameter values.

In the example illustrated in FIG. 7, none of the parameters 304 in Group B of the parameter set 302 are different for the new waveform type, and thus none of the change flags 726 indicate a change as shown in FIG. 7. There are, therefore, no parameter fields in the parameter section 734.

As shown in FIG. 7, the second tier 723 can also include an S flag 728 that indicates that there is a subsequent tier. In the example shown in FIG. 7, there is a subsequent tier, namely, a third tier 743, and the S flag 728 is consequently highlighted in FIG. 7.

The third tier 743 can be generally similar in structure and format to the first tier 703 and the second tier 723. As shown, the third tier 743 can comprise a change indicator section 744 that comprises c number of change flags 746 (which are denoted FC1, FC2, FC3, . . . , FCc in FIG. 7) in which there is a change flag 746 for every parameter 304 in a group C of c number of the parameters 304 in the parameter set 302. The c number of parameters 304 in group C need not be contiguous in the parameter set 302. The change flags 746 can otherwise be generally like the change flags 506 of FIG. 5 as discussed above. For example, each change flag 746 can indicate whether the value of its corresponding parameter 304 is different in the new waveform type compared to the current waveform type.

The parameter section 754 of the third tier 743 can be generally the same as the parameter section 514 of FIG. 5. That is, the parameter section 754 can include a parameter field 756 only for parameters 304 of the parameter set 302 whose change flag(s) 746 in the change indicator section 744 indicate a change generally as discussed above with respect to FIG. 5, and each such parameter field 756 can hold the value (which can be absolute or relative) of the corresponding parameter in the new waveform type also generally as discussed above with respect to FIG. 5. Alternatively, the parameter section 754 can include parameter fields 756 for some but not all of the parameters in group C of the parameter set that are the same for the current waveform type and the new waveform type, and the corresponding change flags 746 can indicate the presence of such parameter values.

In the example illustrated in FIG. 7, only the parameter 304 in Group C of the parameter set 302 that correspond to change flag 746 FC3 is different for the new waveform type, and thus only change flag 746 FC3 indicates a change as shown by the highlighting in FIG. 7. There is thus a parameter field 756 in the parameter section 754 for the parameter $P_{FC3}$ where parameter $P_{FC3}$ is the parameter 304 in the parameter set 302 that correspond to change flag 746 FC3. It is noted that parameter $P_{FC3}$ is not necessarily the third parameter P3 of the parameters 304 in the parameter set 302 (see FIG. 3).

As shown in FIG. 7, the third tier 743 can include an S flag 748, which can be generally like the S flag 708 and the S flag 728. That is, the S flag 748 can indicate whether there is a next tier. In the example shown in FIG. 7, there is not a next tier, and the S flag 748 is consequently not highlighted.

As discussed above, the parameters 304 can be grouped in the Groups A, B, and C by common characteristic or characteristics. For example, the parameters 304 in Group A (to which the change flags 706 in the first tier 703 correspond) can have a likelihood of changing from waveform type to waveform type that is greater than a first likelihood. The parameters 304 in Group B (to which the change flags 726 in the second tier 723 correspond) can have a likelihood of changing from waveform type to waveform type that is less than the first likelihood but greater than a second likelihood, and the parameters 304 in Group C (to which the change flags 746 in the third tier 743 correspond) can have a likelihood of changing from waveform type to waveform type that is less than the second likelihood but greater than the third likelihood.

The tiered variable length header 700 illustrated in FIG. 7 is an example only, and variations and different configurations are contemplated. For example, the variable length header 700 is not limited to three tiers 703, 723, 742 but can have more or fewer than three tiers. As another example, the number of change flags 706, 726, 746, and hence the number of parameter fields 716, 756 in the parameter sections 714, 734, 754, can be different than shown in FIG. 7. As yet another example, there need not be a master change (MC) flag 702. As still further examples, the S flag 708 can be replaced with a field that identifies the tiers that follow the first tier 703. In such an example, a field that replaces the S flag 708 can identify the third tier 743 as following the first tier 703, and the header 700 need not include the second tier 723.

Regardless, like the MC flag 502 and change flags 506 of FIG. 5, the MC flag 702, each of the change flags 706, 726, 746, and each of the S flags 708, 728, 748 can have two possible states and thus can each consist of a single bit. The parameter fields 716, 756, in contrast, like the parameter fields 516 of FIG. 5, can each hold a new value for a parameter and thus typically consist of many bits. Generally as discussed above with respect to FIG. 5, however, in some embodiments, the MC flag 702, each of the change flags 706, 726, 746, and/or each of the S flags 708, 728, 748 can each consist of more than one bit. In some embodiments, the MC flag 702, each of the change flags 706, 726, 746, and each of the S flags 708, 728, 748 can comprise two, four, eight, twelve, sixteen, thirty-two, forty-eight, sixty-four or more bits to represent merely a binary state. Moreover, in some embodiments, the MC flag 702 can comprise more bits than any of the change flags 706, 726, 746 and the S flags 708, 728, 748. The MC flag 702, each of the change flags 706, 726, 746, and/or each of the S flags 708, 728, 748 can thus have more protection against transmission errors than the parameter fields 716, 756 in a transmission of modulated waveforms 114 containing a variable length header 700. In addition, the MC flag 702 can be provided with more protection against transmission errors even than any of the change flags 706, 726, 746 and/or S flags 708, 728, 248. Thus, for example, the MC flag 502 can comprise more bits (e.g., two, three, four, five, six, seven, eight, or more times the number or bits) than any of the change flags 706, 726, 746 and/or the S flags 708, 728, 248. Generally as discussed above, the foregoing can increase the robustness and reliability of the system 100 (see FIG. 1).

Generally similar to the discussion above with respect to the variable length header 500 of FIG. 5, other strategies for providing the MC flag 702, the S flags 708, 728, 748, and/or the change flags 706, 726, 746 with more robust error protection than the parameter fields 716, 756 can be employed. For example, the MC flag 702, the S flags 708, 728, 748, and/or change flags 706, 726, 746 can be encoded with an FEC code that is more robust than an FEC code utilized to encode the parameter fields 716, 756. As another example, the MC flag 702 can be encoded with an FEC code that is more robust than an FEC code utilized to encode the S flags 708, 728, 748 and/or the change flags 706, 726, 746, which can be encoded with a more robust FEC code than utilized to encode the parameter fields 716, 756. More generally, two or more of the MC flag 702, the S flags 708, 728, 748, and/or the change flags 706, 726, 746 can be encoded with unequally robust FEC codes.

As mentioned, the process 800 of FIG. 8 is an example of a process that can generate the variable length header 700 of FIG. 7. The process 800 is thus an example of performing the step 410 of FIG. 4. For ease of illustration and discussion, the process 800 is discussed below with respect to the tiered variable length header 700 of FIG. 7, but the process 800 is not so limited. In some embodiments, the process 800 can be performed in whole or in part by the VHL module 212 (see FIG. 2).

As shown in FIG. 8, at step 802, the process 800 can identify the parameters 304 of the parameter set 302 for the new waveform type that have a different value than for the current waveform type. This can be performed in the same way as described above for step 602 of FIG. 6.

Assuming that the value of at least one parameter 304 is different, at step 804, the process 800 can set the MC flag 702 to indicate a change. Although not shown in FIG. 8, if no parameters 304 have different values, the process 800 can set the MC flag 702 to indicate no change at step 804, and the process 800 can terminate. The resulting variable length header 700 can thus consist solely or essentially of the MC flag 702.

Otherwise, the process 800 can, at step 806, set an internal indicator to identify that the current tier being created is the first tier 703 and then create the first tier 703 at steps 808 through 814 for the parameters 304 of Group A (as discussed above). That is, at step 808, the process 800 can create the change indicator section 704 of the first tier 703 with the change flags 706, if any, that correspond to parameters 304 in group A that have a different value for the new waveform type compared to the current waveform type. All of the other change flags 706 can be set to indicate no change. At step 810, the process 800 can create a parameter field 716 with the new parameter value for each of the parameters 304 indicated by change flags 706 to be different in the new waveform type. Referring to the example illustrated in FIG. 7 in which there are changes only to the parameters that correspond to the FA2 and FAa change flags 706 in the first tier 703, the process 800 can, at step 808, set the FA2 and FAa change flags 706 to indicate a change in their corresponding parameters 304 and set all of the other change flags 706 to indicate no change. The process 800 can also, at step 810, append parameter fields $P_{FA2}$ and $P_{FAa}$ with the new values (absolute or relative) of the parameters 304 that correspond to the change flags 706 FA2 and FAa.

At step 812, the process 800 can determine whether there are any parameters 304 in others of the parameter groups whose values are different for the new waveform type. If not, the process 800 can set at step 818 the S flag 708 in the first tier 703 to indicate that there are no more tiers and end at 820. The resulting variable length header 700 can thus consist solely or essentially of the MC flag 702 and the first tier 703 (see FIG. 7).

If, however, others of the parameter groups have values that are different for the new waveform type, the process 800 can set at step 814 the S flag 708 in the first tier 703 to indicate that there are more tiers in the header 700. In the example shown in FIG. 7, there is a parameter 304 in a third group (Group C) whose value is different in the new waveform type. Consequently, the process 800 sets the S flag 708 to indicate that there is a subsequent tier. In the example shown in FIG. 7, at this point, the MC flag 702 and first tier 703 have been created as illustrated in FIG. 7.

At step 816, the process 800 can increment the internal tier indicator to the next tier and then create the next tier by repeating steps 808 through 814 for the next parameter group of the parameters 304 in the parameter set 302. In the example shown in FIG. 7, the process 800 can create the change indicator section 724 of the second tier 723 with the change flags 726, if any, that correspond to parameters 304 in Group B that have a different value for the new waveform type compared to the current waveform type. All of the other change flags 726 can be set to indicate no change. At step 810, the process can create a parameter field (none are shown in FIG. 7) with the new parameter value for each of the parameters 304 indicated by flags 726 to be different in the new waveform type. In the example shown in FIG. 7, none of the parameters 304 in the second group have a different value in the new waveform type. Accordingly, all of the change flags 726 in the change indicator section 724 indicate no change, and there need be no parameter fields in the parameter section 734.

At step 812, the process 800 can determine whether there are any parameters 304 in parameter groups other than the first two groups whose values are different for the new waveform type. If not, the process 800 can set at step 818 the S flag 728 in the second tier 723 to indicate that there are no more tiers and end at 820. The resulting variable length header 700 can thus consist solely or essentially of the MC flag 702, the first tier 703, and the second tier 723 (see FIG. 7).

If, however, others of the parameter groups have values that are different for the new waveform type, the process 800 can set at step 814 the S flag 728 in the second tier 723 to indicate that there are more tiers. As noted above, in the example shown in FIG. 7, there is a parameter 304 in a third group whose value is different in the new waveform type. Consequently, the process 800 sets the S flag 728 to indicate that there is a subsequent tier. In the example shown in FIG. 7, at this point, the MC flag 702, the first tier 703, and the second tier 723 have been created as illustrated in FIG. 7.

At step 816, the process 800 can increment the internal tier indicator to the next tier and then create the next tier by repeating steps 808 through 814 for the next parameter group of the parameters 304 in the parameter set 302. In the example shown in FIG. 7, the process 800 can create the change indicator section 744 of the third tier 743 with the change flags 746, if any, that correspond to parameters 304 in the third parameter group that have a different value for the new waveform type compared to the current waveform type. All of the other change flags 746 can be set to indicate no change. At step 810, the process 800 can create a parameter field 756 with the new parameter value for each of the parameters 304 indicated by flags 746 to be different in the new waveform type. Referring to the example illustrated in FIG. 7, the process 800 can set the FC3 change flag 746 to indicate a change and set all of the other change flags 746 to indicate no change, and then append parameter field $P_{FC3}$ with the new value (absolute or relative) of the parameter 304 that corresponds to the change flag 746 FC3 in the third tier 743.

At step 812, the process 800 can determine whether there are any parameters 304 in parameter groups other than the first three groups whose values are different for the new waveform type. If not, the process 800 can set at step 818 the S flag 748 in the third tier 743 to indicate that there are no more tiers and end at 820. The resulting variable length header 700 can thus consist solely or essentially of the MC flag 702, the first tier 703, the second tier 723, and the third tier 743 as shown in FIG. 7.

If, however, others of the parameter groups have values that are different for the new waveform type, the process 800 can set at step 814 the S flag 748 in the third tier 743 to indicate that there are more tiers. The process 800 can continue creating additional tiers in the variable length header 700 by repeating steps 816 and 808 through 814. It is noted that the process 800 illustrated in FIG. 8 is an example, and variations are contemplated. For example, there can be more or fewer steps, and at least some of the steps can be in a different order.

As discussed above, the processes 600 and 800 of FIGS. 6 and 8 are non-limiting examples of accomplishing step 410 of the process 400 of FIG. 4. Returning again to a discussion of FIG. 4, after step 410, the process 400 can process at step 412 the variable length header generated at step 410. For example, processing at step 412 can include encrypting the variable length header, for example, with the encryption module 216 as discussed above. Processing at step 412 can alternatively or in addition include encoding the variable length header with an FEC code, for example, with the error coding module 218 as discussed above. Processing at step 412 can alternatively or in addition include processing the variable length header in other ways. As yet another alternative, no processing of the variable length header need be performed at step 412. That is, step 412 can be skipped or not included in the process 400.

At step 414, the process 400 can modulate the variable length header (as processed at step 412) into modulated waveforms 114, which can be the "current waveform type" as defined above. The variable length header (whether or not processed at step 412) can comprise bits, and those bits can be modulated at step 414 into modulated waveforms 114 of the current waveform type. Step 414 can be performed, for example, by the modulation module 220 as discussed above.

At step 416, the modulated waveforms 114 can be transmitted as waveform signals 118 through the transmission medium 120 to the receiving node 132. Step 416 can be performed, for example, by the transmitter 116 (see FIG. 1).

The process 400 has thus processed and modulated the variable length header generated at step 410 into modulated waveforms 114 of the current waveform type as defined by the values of the current parameter set 302 and transmitted the modulated waveforms 114 to the receiving node 132. The receiving node 132 has now been sent the variable length header generated at step 410, which indentifies the parameters 304 in the parameter set 302 that are different for the new waveform type. The receiving node 132 will thus have all the information needed to start decoding modulated waveforms 114 from the sending node 102 modulated using the new waveform type.

At step 418, the process 400 can thus set the layer 1 processing module(s) 112 to process and modulate future transmissions to the receiving node 132 in accordance with the new waveform type. Execution of steps 410 through 418 has thus informed the receiving node 132 of the new waveform type determined at step 406 and set the sending node 102 to generate and send to the receiving node 132 future modulated waveforms 114 as the new waveform type, which thus now becomes the current waveform type. As shown in FIG. 4, the process 400 can then branch back to the steps 406 and/or 408 to wait for more bit streams 110 at step 408 or another change of waveform type at step 406.

Figure 9:
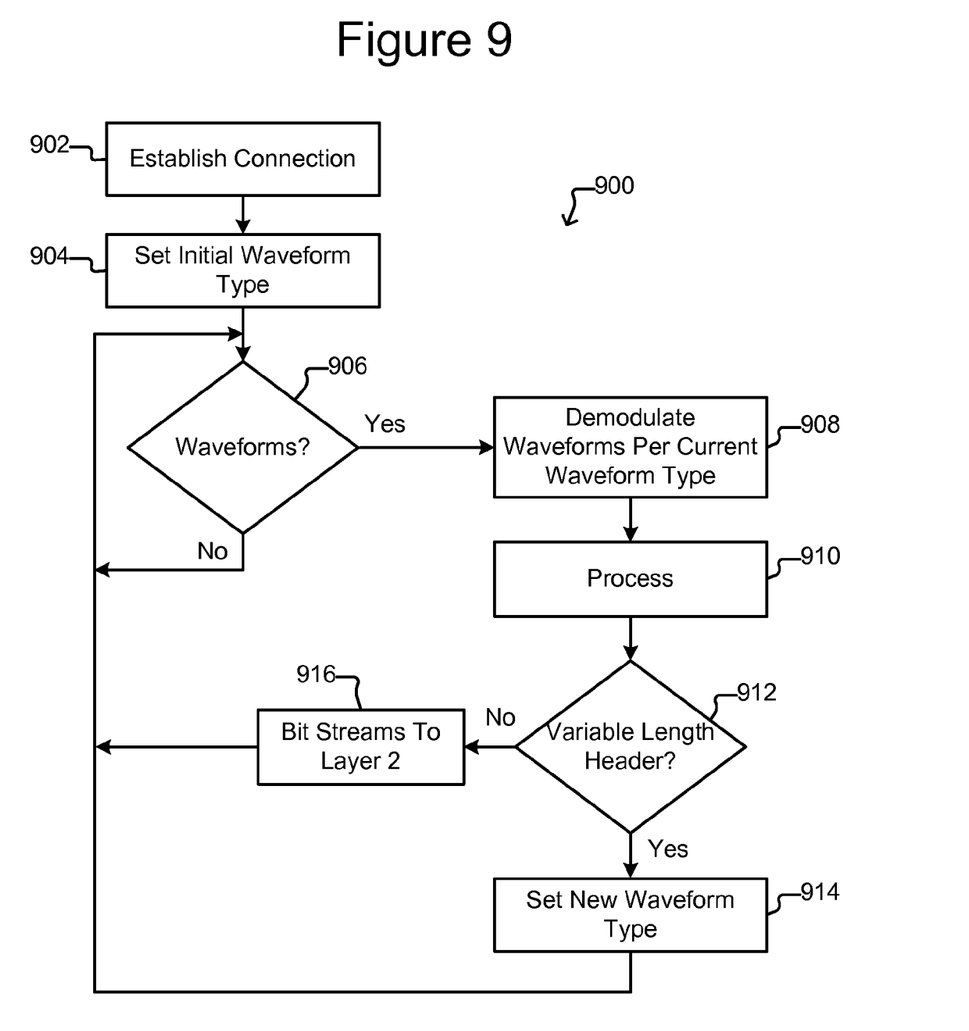
FIG. 9 is a simplified flow chart illustrating an example of operation of the layer 1 processing module(s) in the receiving node of the system of FIG. 1 according to some embodiments of the invention.

Described thus far are the system 100 and examples of operation of the sending mode 102. FIG. 9 illustrates a process 900 that is an example of operation of the receiving node 132.

FIG. 9 illustrates a process 400 that is an example of operation of the layer 1 processing module(s) 142 of the receiving node 132. Although not shown, the layer 1 processing module(s) 142 can comprise a memory like memory 202 and a controller like controller 204, analog circuitry, digital logical circuitry, and/or the like. The process 900 can be embodied as machine executable instructions (e.g., software, firmware, microcode, or the like) stored as non-transitory signals in the memory that cause the controller to perform the process 900. Alternatively, the process 900 can be embodied as hardwired logic circuitry in the layer 1 processing module(s) 142 or the process 900 can be embodied as a combination of the foregoing machine executable instructions and hardwired logic circuitry.

As shown in FIG. 9, at step 902, the process 900 can establish a communications connection with the sending node 102. Step 902 can be performed in conjunction with step 402 of FIG. 4. At step 904, the process 900 can set the initial waveform type in the layer 1 processing module(s) 142. Step 904 can be performed, for example, by receiving the parameter set 302 for the initial waveform type from the sending node 102, which as discussed above, can be sent from the sending node 102 to the receiving node 132 as part of steps 402 and 404 of FIG. 4.

At step 906, the process 900 waits for modulated waveforms 144 from the sending node 102 (see FIG. 1). When modulated waveforms 144 are determined at step 906 to have been received in the signals 118 (see FIG. 1), the process 900 demodulates and processes the modulated waveforms 144 at step 908 in accordance with the current waveform type set in the layer 1 processing module(s) 142 in the receiving node 132. The current waveform type at the layer 1 processing module(s) 142 is either the initial waveform type set at step 904 if step 914 has not been performed or the most recent new waveform type set when step 914 was last performed. More specifically, at step 908, the process 900 can demodulate the modulated waveforms 144 in accordance with the values of modulation parameters 304 in the parameter set 302 of the current waveform type set in the layer 1 processing module(s) 142. The demodulating can thus be the reverse of the modulating performed at step 414 or step 422 of FIG. 4. Further processing at step 910 of the modulated waveforms 144 can include decrypting and/or decoding in accordance with encryption and/or error detection and correction coding parameters 304, if any, in the parameter set 302 of the current waveform type. The processing at step 910 can be the reverse of any such encryption or error detection and/or correction coding performed at step 412 or step 420 of FIG. 4.

Referring to FIG. 9, at step 912, the process 900 can determine whether a variable length header (as generated at step 410 in FIG. 4) was obtained at step 908 from the modulated waveforms 144 detected at step 906. If yes, the process 900 sets at step 914 the current waveform type to the new waveform type indicated by the variable length header. As discussed above, the variable length header (which was generated at step 410 of FIG. 4) identifies the parameters 304 in the parameter set 302 of the new waveform type whose values are different as compared to the current waveform type. The process 900 can thus perform step 914 by using the variable length header to identify which of the parameters 304 in the parameter set 302 stored in the layer 1 processing module(s) 142 at the receiving module 132 are different for the new waveform type as compared to the current waveform type and then updating only those different parameters 304 with the new values for those parameters in the variable length header.

The process 900 thus sets the current waveform type to the new waveform type indicated by the variable length header if a variable length header is detected at step 912. The process 900 will thereafter perform step 908 with the new waveform type.

If, however, a variable length header is not detected at step 912, the process 900 branches to step 916 (rather than step 914) and provides the bit streams 140 demodulated from the modulated waveforms 144 at step 908 to the layer 2 processing module(s) 138. (In the simplified example shown in FIG. 9, it is assumed that the modulated waveforms 144 demodulated at step 908 are bit streams 140 if not a variable length header.) The invention, however, is not so limited. As discussed above, the layer 2 processing module(s) 138 through layer N processing module(s) 136 can sequentially process the bit streams 140 to produce the communication 133 (see FIG. 1).

Although specific embodiments and applications of the invention have been described in this specification, these embodiments and applications are exemplary only, and many variations are possible.

We claim:

1. A process of changing a waveform type of modulated waveforms generated and transmitted by a sending node to a receiving node, wherein said waveform type is defined by a parameter set that sets modulation characteristics of said waveform type, said process comprising:
    receiving at said sending node digital communications to be transmitted to said receiving node;
    processing said digital communications hierarchically at each layer of a stack of hierarchical processing layers within said sending node, said processing producing at a second lowest processing layer in said stack bit streams corresponding to said digital communications;
    modulating in a lowest processing layer in said stack in said sending node said bit streams into waveforms of a current waveform type to produce bit-stream-modulated waveforms of said current waveform type;
    transmitting said bit-stream-modulated waveforms from said sending node through a transmission medium to said receiving node; and
    upon determining to change said current waveform type to a new waveform type:
        generating in said lowest processing layer in said stack in said sending node a variable length header, wherein said variable length header identifies as a changed parameter each parameter in said parameter set that has a different value for said new waveform type as compared to said current waveform type, and said variable length header includes a parameter value for fewer than all of said parameters in said parameter set but includes a parameter for each said changed parameter(s);
        modulating in said lowest processing layer in said stack in said sending node said variable length header into a waveform of said current waveform type to produce a variable-length-header-modulated waveform; and
        transmitting said variable-length-header-modulated waveform from said sending node through said transmission medium to said receiving node.

2. The process of claim 1, wherein said parameter set comprises parameters defining a modulation scheme.

3. The process of claim 1 further comprising encrypting said variable length header in accordance with an encryption scheme, wherein said modulating said variable length header comprises modulating said variable length header after encrypting said variable length header.

4. The process of claim 3, wherein said parameter set comprises parameters defining said encryption scheme.

5. The process of claim 1, wherein said generating said variable length header comprises, for each of a plurality of sub-sets of less than all of said parameters of said parameter set in which a value of at least one of said parameters is different for said new waveform type as compared to said current waveform type, creating a tiered portion of said variable length header comprising a change flag for each said parameter in said sub-set and a value of said parameter if said change flag indicates that said parameter is different for said new waveform type as compared to said current waveform type.

6. The process of claim 1, wherein said lowest layer further performs:
    said transmitting said bit-stream-modulated waveforms, and
    said transmitting said variable-length-header-modulated waveform.

7. The process of claim 1 further comprising, after said transmitting said variable-length-header-modulated waveform and with said new waveform set as said current waveform, repeating:
    said receiving said digital communications,
    said processing said digital communications to produce bit streams,
    said modulating at said sending node said bit streams into waveforms to produce bit-stream-modulated waveforms, and
    said transmitting said bit-stream-modulated waveforms from said sending node through said transmission medium to said receiving node.

8. The process of claim 1, wherein said generating said variable length header comprises:
    generating a change indicator section of said variable length header having a change flag for each said parameter in said parameter set, each said change flag indicating whether a corresponding one of said parameters is a changed parameter, and
    generating a parameter section having a parameter value only for each said changed parameter but not a parameter value for any of the others of said parameters in said parameter set.

9. The process of claim 8, wherein said generating said change indicator section further comprises generating a master change flag indicating whether or not at least one of said parameters is a changed parameter.

10. The process of claim 9, wherein:
    each said change flag comprises a first number of binary bits,
    said master change flag comprises a second number of binary bits,
    said first number is greater than one, and
    said second number is greater than said first number.

11. The process of claim 10, wherein said second number is at least four times greater than said first number.

12. The process of claim 8, wherein each said parameter value in said parameter section is an absolute value of said corresponding changed parameter.

13. The process of claim 8, wherein each said parameter value in said parameter section is a relative value representing a difference between said value of said corresponding parameter for said current waveform type and said value of said corresponding parameter for said new waveform type.

14. The process of claim 8, wherein said generating said variable length header further comprises:
    encoding said change indicator section with a first FEC code, and
    encoding said parameter section with a second FEC code, wherein said first FEC code and said second FEC code are unequally robust.

15. The process of claim 1 further comprising, after said transmitting said variable length header to said receiving node:
    generating in said lowest processing layer in said stack in said sending node another variable length header consisting essentially only of a master change flag indicating none of said parameters of said current waveform are changed parameters, modulating in said lowest processing layer in said stack in said sending node said another variable length header into a waveform of said current waveform type to produce another variable-length-header-modulated waveform; and transmitting said another variable-length-header-modulated waveform from said sending node through said transmission medium to said receiving node.

16. The process of claim 1, wherein:

said parameter set comprises a plurality of unique sub-sets of said parameters; and said generating comprises creating a tier in said variable length header only for each of said unique sub-sets that contains a changed parameter, each said tier comprising a change flag for each said parameter in said unique sub-set and a parameter value only for each said changed parameter in said unique sub-set.

17. The process of claim 16, wherein said creating comprises creating said tiers one at a time in a sequence.

18. The process of claim 17, wherein said creating further comprises:

setting a flag in each said tier in said sequence except a last of said tiers in said sequence indicating that there is next tier in said sequence, and setting a flag in said last tier in said sequence indicating that there are no additional tiers in said sequence.

19. The process of claim 1, wherein:

said parameter set comprises a plurality of unique sub-sets of said parameters; and said generating comprises creating a tier in said variable length header for all but at least one of said unique sub-sets, where:

each of said created tiers comprises a change flag for everyone of said parameters in said unique sub-set to which said tier corresponds and a parameter value only for each changed parameter in said unique sub-set, and none of said parameters in at least one of said unique sub-sets for which no tier is created is a changed parameter.

20. A sending node comprising:

a modulating module disposed in a lowest processing layer of a stack of hierarchical processing layers within said sending node, said modulating module configured to:

receive bit streams from a higher processing layer in said stack and modulate said bit streams into modulated waveforms of a waveform type to produce modulated-bit-stream waveforms for transmission through a transmission medium to a receiving node, and modulate variable length headers into modulated waveforms of said waveform type to produce variable-length-header waveforms for transmission through said transmission medium to said receiving node;

a waveform control module configured to set said waveform type in accordance with a parameter set that defines waveform modulation characteristics, wherein said waveform control module is also configured to change said waveform type from a current waveform type to a new waveform type; and a VLH module disposed in said lowest processing layer of said stack of hierarchical processing layers within said sending node, said VLH module configured to generate a said variable length header that identifies changed parameters in said parameter set that are different for said new waveform type as compared to said current waveform type, wherein said variable length header includes a parameter value for fewer than all of said parameters in said parameter set but includes a parameter for each said changed parameter(s).

21. The sending node of claim 20, wherein said parameter set comprises parameters defining a modulation scheme.

22. The sending node of claim 20 further comprising an encryption module configured to encrypt said variable length header in accordance with an encryption scheme.

23. The sending node of claim 22, wherein said parameter set comprises parameters defining said encryption scheme.

24. The sending node of claim 20 further comprising an error coding module configured to encode said variable length header in accordance with a forward error correction (FEC) code for detecting and correcting transmission errors.

25. The sending node of claim 24, wherein said parameter set comprises parameters defining said FEC code.

26. The sending node of claim 24, wherein said error coding module is further configured to:

encode a first section of said variable length header that comprises an identification of said changed parameters with a first FEC code, and encode a second section of said variable length header that comprises said parameter values with a second FEC code, wherein said first FEC code and said second FEC code are unequally robust.

27. The sending node of claim 20, wherein said variable length header comprises a change flag for each parameter of said parameter set, each said change flag having only two possible states, but each said change flag comprising more than one bit.

28. The sending node of claim 20, wherein said variable length header comprises tiers, wherein each said tier comprises:

a change flag for each parameter in a sub-set of less than all of said parameters of said parameter set, each said change flag indicating whether a corresponding one of said parameters in said sub-set has a different value for said new waveform type as compared to said current waveform type, and a parameter value for each parameter in said sub-set that corresponds to a changed parameter as indicated by said change flags but fewer than every parameter in said sub-set.

29. The sending node of claim 28, wherein each said tier further indicates whether there is a subsequent tier in said variable length header.

* * * * *